United States Patent [19]

Kim

[11] Patent Number: 5,937,061
[45] Date of Patent: Aug. 10, 1999

[54] POWER SAVING CONTROL APPARATUS FOR SIMPLE ELECTRONIC EXCHANGE SYSTEM

[75] Inventor: Ki-Wook Kim, Incheonkwangyeok, Rep. of Korea

[73] Assignee: SamSung Electronics Co., Ltd., Kyungki-do, Rep. of Korea

[21] Appl. No.: 08/777,767

[22] Filed: Dec. 30, 1996

[30] Foreign Application Priority Data

Dec. 30, 1995 [KR] Rep. of Korea ...................... 95-67801

[51] Int. Cl.⁶ ................................................. H04M 11/00
[52] U.S. Cl. ......................... 379/413; 379/157; 379/161
[58] Field of Search ............................. 379/413, 102.04, 379/156, 157, 201, 198, 233, 244, 161; 307/66; 455/563, 38.3; 320/2, 30, 15, 29

[56] References Cited

U.S. PATENT DOCUMENTS

| | | | |
|---|---|---|---|
| 4,481,384 | 11/1984 | Mattews | 379/188 |
| 4,539,437 | 9/1985 | Giacopelli et al. | 379/384 |
| 4,653,088 | 3/1987 | Budd et al. | 379/413 |
| 4,674,115 | 6/1987 | Kaleita et al. | 379/201 |
| 4,845,773 | 7/1989 | Attallah | 379/102.05 |
| 4,876,717 | 10/1989 | Barron et al. | 379/88 |
| 4,926,470 | 5/1990 | Sanford | 379/199 |
| 4,929,880 | 5/1990 | Henderson et al. | 70/63 |
| 4,998,291 | 3/1991 | Marui et al. | 455/563 |
| 5,343,514 | 8/1994 | Snyder | 379/93.01 |
| 5,381,472 | 1/1995 | Kobayashi et al. | 379/413 |
| 5,388,150 | 2/1995 | Schneyer et al. | 379/67 |
| 5,444,761 | 8/1995 | Nagashima | 455/556 |
| 5,473,667 | 12/1995 | Neustein | 455/31.2 |
| 5,566,339 | 10/1996 | Perholtz et al. | 379/38 |
| 5,588,054 | 12/1996 | Shin et al. | 379/372 |
| 5,594,319 | 1/1997 | Thandiwe | 429/7 |
| 5,623,321 | 4/1997 | Harsanyi | 379/413 |
| 5,655,007 | 8/1997 | McAllister | 379/91.01 |
| 5,790,646 | 8/1998 | Moon | 379/198 |

FOREIGN PATENT DOCUMENTS 2 251 762   7/1992   United Kingdom .

*Primary Examiner*—Krista Zele
*Assistant Examiner*—Jacques M. Saint-Surin
*Attorney, Agent, or Firm*—Robert E. Bushnell, Esq.

[57] ABSTRACT

Power saving control apparatus and method for a simple electronic exchange system which may ensure the efficient system operation and reliably maintain the operation of the system by the usage of the electric power from an auxiliary AC power in consideration of battery power even after a main AC power is down. The power saving control apparatus for a simple electronic exchange system which is coupled to a plurality of extension telephones, each having a unit for transmitting a signal asking for setting or releasing a power saving mode and a unit for inputting passwords for each extension telephone, and operating from an auxiliary AC power when a main AC power is down, comprising: a memory for storing the passwords corresponding to the respective extension telephones; a unit for transmitting a signal requesting the input of the passwords to the extension telephones in response to a request for setting the power saving mode, which is received from an arbitrary extension telephone; a unit for checking if a password that is inputted from the extension telephone corresponds with an original password of the extension telephone previously registered in the memory; a unit for transmitting an operation limit command to the extension telephone when the two passwords are coincided with each other; and a unit for cutting off a call with the extension telephone until the power saving mode is changed for another mode when the two passwords are coincided with each other.

11 Claims, 2 Drawing Sheets

POWER SAVING CONTROL APPARATUS FOR SIMPLE ELECTRONIC EXCHANGE SYSTEM

BACKGROUND OF THE INVENTION

1. Field of the Invention

The present invention relates to power saving control apparatus and method for a simple electronic exchange system, and more particularly, to apparatus and method for efficiently operating a simple electronic exchange system even that a main alternating current (AC) input power is down. The present application is based upon Korean Application No. 67801/1995, which is incorporated herein by reference.

2. Description of the Related Art

When a main AC power of a simple electronic exchange system is down, the system operates by being supplied with an auxiliary AC power from a secondary battery. However, there is a limit to operate the system as described above. Therefore, it is necessary to properly operate the system in consideration of the capacity of the battery, until the main AC power is restored, to thereby reliably sustain the operation of the system. But, according to a conventional technique, since a simple electronic exchange system operates as usual even when it is being powered by an auxiliary AC power without consideration after a main AC power has been down, it results in problem in that the auxiliary AC power is down before restoring the main AC power.

Meantime, most of the electric power of the simple electronic exchange system is largely used for the operations of a general telephone as a terminal device or an extension telephone, i.e. when the extension telephone or the general telephone is ringing, or a light emitting diode (LED) or liquid crystal display (LCD) of the extension telephone goes into action. All the operations of the extension telephone are unnecessarily continued even if an extension subscriber is absent for a long period of time to thereby waste power without need. Such a waste of power is undesirable in every aspect of the system operation when the main AC power is down and the extension subscriber is absent for a long period of time.

SUMMARY OF THE INVENTION

The present invention is directed to a power saving control apparatus for a simple electronic exchange system which substantially obviates the above-described problems due to limitations and disadvantages of the related art.

It is an object of the present invention to provide power saving control apparatus and method for a simple electronic exchange system which may ensure the efficient system operation and reliably maintain the operation of the system by the usage of the electric power from an auxiliary AC power in consideration of battery power even after a main AC power is down.

It is another object of the present invention to provide power saving control apparatus and method for a simple electronic exchange system which can minimumly manage the operation of a corresponding telephone set when the extension subscriber is absent for a long period of time.

In order to achieve the above objects, there is provided a power saving control apparatus for a simple electronic exchange system which is coupled to a plurality of extension telephones, each having a unit for transmitting a signal asking for setting or releasing a power saving mode and a unit for inputting passwords for each extension telephone, and operating from an auxiliary AC power when a main AC power is down, comprising: a memory for storing the passwords corresponding to the respective extension telephones; a unit for transmitting a signal requesting the input of the passwords to the extension telephones in response to a request for setting the power saving mode, which is received from an arbitrary extension telephone; a unit for checking if a password that is inputted from the extension telephone corresponds with an original password of the extension telephone previously registered in the memory; a unit for transmitting an operation limit command to the extension telephone when the two passwords are coincided with each other; and a unit for cutting off a call with the extension telephone until the power saving mode is changed for another mode when the two passwords are coincided with each other.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE PREFERRED EMBODIMENT

In the following description, numeral specific details such as components and frequencies of the concrete circuit, are set forth to provide a more through understanding of the present invention. It will be apparent, however, to one skilled in the art that the present invention may be practiced without these specific details. The detailed description on known function and constructions unnecessarily obscuring the subject matter of the present invention will be avoided in the present invention.

Figure 1:
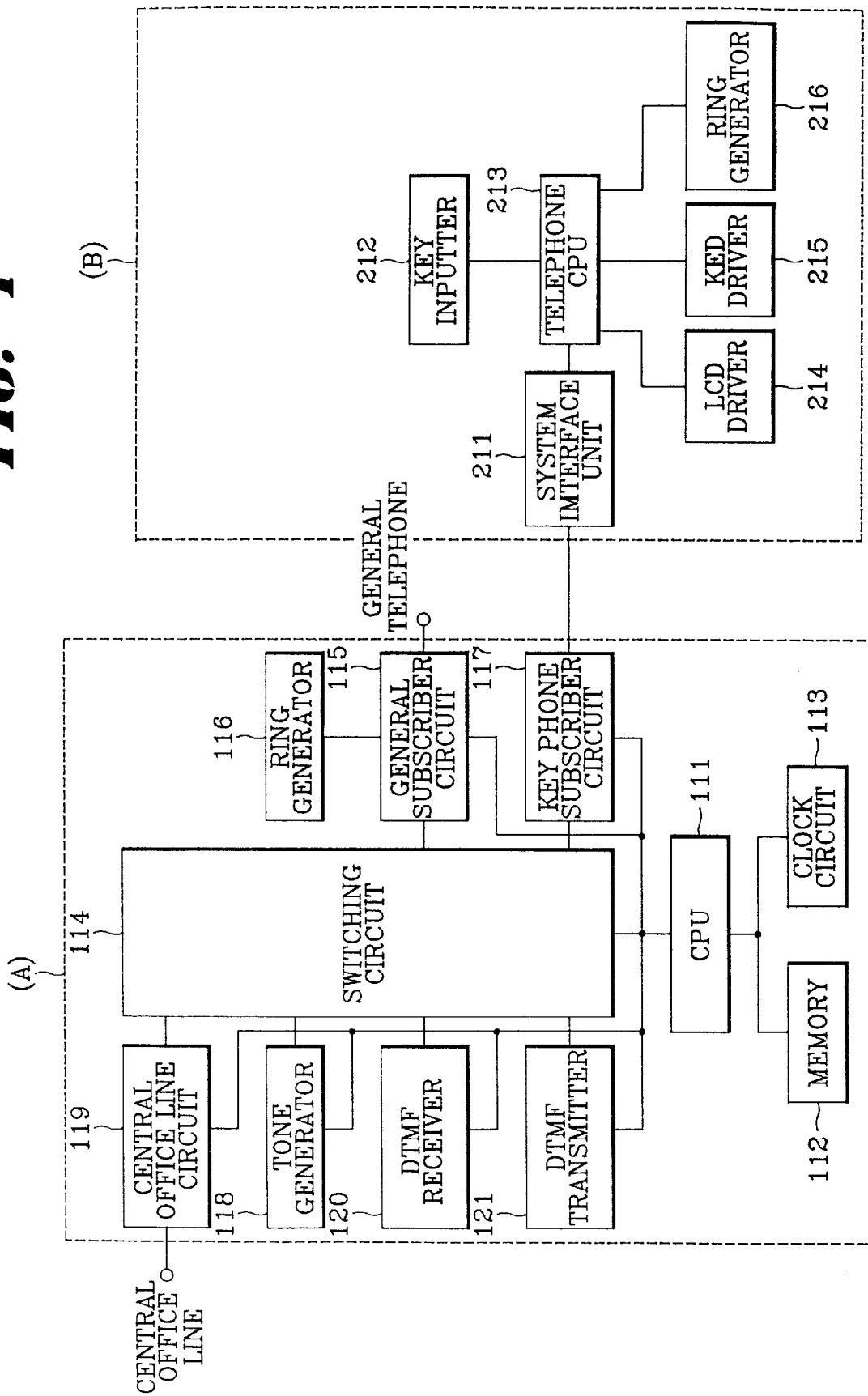
FIG. 1 is a block diagram showing the construction of a key phone system and a key phone unit in accordance with the present invention.

FIG. 1 is a block diagram showing the construction of a key phone system A and a key phone unit B in accordance with the present invention.

The key phone system A includes: a central processing unit (hereinafter, referred to as CPU) 111 for generally controlling communication switching and managing the overall operations of the key phone system A so as to provide various services to a user; a memory 112 for storing, programs and initial service data of the CPU 111 for implementation of call service and various functions, and temporarily storing data processed by the CPU 111; a clock circuit 113 for generating preset time data and producing the generated data to the CPU 111; a switching circuit 114 for switching various tones and voice data under the control of CPU 111, a general subscriber circuit 115 which furnishes current to a general telephone (not shown) for communication under the control of the CPU 111 and interfacing the general telephone with switching circuit 114; a ring generator 116 for generating a ring signal to one of subscriber lines; a key phone subscriber circuit 117 for transmitting/receiving various data to or from the key phone unit B, supplying current for communication, and interfacing the key phone unit B with the switching circuit 114, which played a role of the subscriber path for connecting the subscriber circuits 115 and 117 with the extension subscriber; a tone generator 118 for generating various tone signals to the switching circuit 114 under the control of the CPU 111; a central office line circuit 119 for seizing a central office line (that connects the central office line circuit 119 with an office switching system) to establish an office communication loop, and interfacing the central office line with switching circuit 114 under the control of the CPU 111; a dual tone multi-frequency (DTMF) receiver 120 for converting a DTMF signal produced by the switching circuit 114 into digital data, and producing the output to the CPU 111; and a DTMF transmitter 121 for converting digital data produced by the CPU 111 into a DTMF signal, and producing the output to the switching circuit 114. Here, the DTMF signal inputted to DTMF receiver 120 may correspond to a telephone number which is inputted by a central office line subscriber or by the extension subscriber. Besides, the output DTMF signal of DTMF transmitter 121 corresponds to the telephone number of the central office line subscriber generated when the extension subscriber calls the central office line subscriber.

Further, the key phone unit B includes: a telephone central processing unit 213 for generally controlling the operation of the key phone unit B; a system interface unit 211 for enabling the key phone unit to communicate with the key phone system A; a key inputter 212 which has a plurality of keys for inputting a password corresponding to each extension or for setting a power saving mode of operation; a liquid crystal display (LCD) driver 214 which allows various messages to appear on LCD; a light emitting diode (LED) driver 215 which indicates various states of the key phone unit B; and a ring generator 216 for producing rings.

Figure 2:
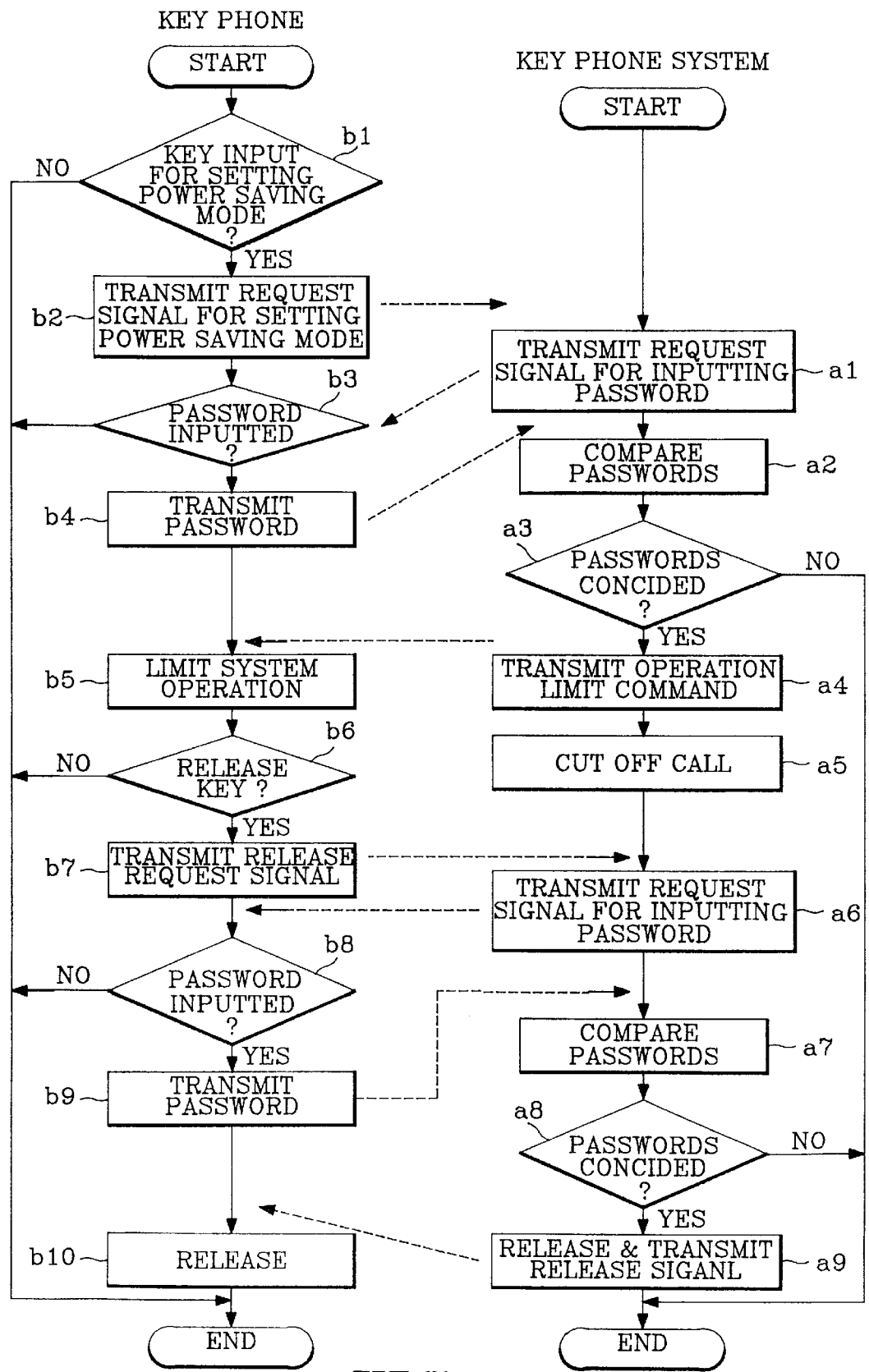
FIG. 2 a control flowchart illustrating the management of the key phone system in accordance with the present invention.

FIG. 2 a control flowchart illustrating the management of the key phone system in accordance with the present invention. With reference to FIG. 2, the operation of the present invention will be now described in detail.

Once a user of the key phone unit B inputs the key for requesting the setting of the power saving mode by using the key inputter 212, the telephone CPU 13 of transmits the request for setting the power saving mode through the system interface unit 211 to the key phone system A(b1 and b2). The CPU 111 of the key phone system A receives the request signal, and demands (a1) password input to the key phone unit B through the key subscriber circuit 117 in order to prevent free use of the telephone unit by persons other than its subscriber. Accordingly, when a given password differs from the previously-recorded password, the key phone system A sends back information that the two passwords do not correspond into the key phone unit B and completes the operation (not shown).

The key phone unit B that has received the request signal for password input, reports this information to the user, and sends out (b3 and b4) a password keyed in by him into the key phone system A. The key phone system A that has received the password from the key phone unit B checks (a2 and a3) if the input password corresponds with that of the key phone unit B previously stored in memory unit 112. In case that the two passwords correspond, the key phone system A sends back (a4) into the key phone unit B an operation limit command along with confirmation of setting of the power saving mode of operation. The key phone system A then cuts off (a5) a call signal to the key phone unit B. In other words, even if the key phone unit B receives an incoming call from another extension, it does not go into action, and telephone connections are not set up. The key phone system A announces to the calling party that the key phone being called is in the power saving mode of operation by sending back a LCD message or a particular signal. LCD and LED data are then not transmitted to the key phone being called any more.

Telephone central processing unit 213 of the key phone unit B that received the operation limit command controls LCD driver 214 to stop a liquid crystal display (not shown) from displaying the message, and controls LED driver 215 to power off a light emitting diode (not shown).

Once the user inputs a release key through the key inputter 212, the key phone unit B sends (b6 and b7) into the key phone system A, a signal asking for revoking the power saving mode of operation. The key phone system A that received the request signal checks if the input password corresponds with the previously-recorded password of the key phone unit B, as described above. In case that the two passwords correspond, the key phone system A transmits a release signal for revoking the operation limit command to the key phone unit B, and re-establishes the normal call incoming service with respect to the key phone unit B (a6 to a9 and b8 to b10).

According to the present invention, even if a main AC power is down, the reliability on a simple electronic exchange system can be sustained by efficiently operating the system with auxiliary AC power in consideration of the capacity of the battery power.

Therefore, it should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A power saving control apparatus for a simple electronic exchange system which is coupled to a plurality of extension telephones, each having a unit for transmitting a signal asking for setting or releasing a power saving mode and a unit for inputting passwords for each extension telephone, and operating from an auxiliary AC power when a main AC power is down, comprising:

a memory for storing said passwords corresponding to the respective extension telephones;

a unit for transmitting a signal requesting the input of said passwords to said extension telephones in response to a request for setting said power saving mode, which is received from an arbitrary extension telephone;

a unit for checking if a password that is inputted from said extension telephone corresponds with an original password of said extension telephone previously registered in said memory;

a unit for transmitting an operation limit command to said extension telephone when said two passwords are coincided with each other; and a unit for cutting off a call with said extension telephone until said power saving mode is changed for another mode when said two passwords are coincided with each other.

2. The power saving control apparatus according to claim 1, further comprising:

a unit for sending out into a calling party, a message reporting that said extension telephone is in said power saving mode, if an incoming call is received to said extension telephone in which said power saving mode is set.

3. The power saving control apparatus according to claim 2, further comprising:

a unit for sending back a signal for revoking said operation limit command into said extension telephone upon receipt of a signal asking for releasing said power saving mode from said extension telephone, and for resetting a normal call service.

4. The power saving control apparatus according to claim 1, wherein said extension telephone which is equipped with a display unit, stops said display unit from being operated in response to said operation limit command.

5. The power saving control apparatus according to claim 4, further comprising:

a unit for sending back a signal for revoking said operation limit command into said extension telephone upon receipt of a signal asking for releasing said power saving mode from said extension telephone, and for resetting a normal call service.

6. The power saving control apparatus according to claim 1, further comprising:

a unit for sending back a signal for revoking said operation limit command into said extension telephone upon receipt of a signal asking for releasing said power saving mode from said extension telephone, and for resetting a normal call service.

7. A power management method for a simple electronic exchange system connected with a plurality of extension telephones and operating from an auxiliary AC power when a main AC power is down, comprising the steps of:

receiving a signal asking for setting a power saving mode of operation from a predetermined one of said extension telephones;

sending a request for password input into said extension telephone in order to establish said power saving mode of operation;

checking if a password that is input from said extension telephone corresponds with a previously-recorded password of said extension telephone;

transmitting an operation limit command to said extension telephone provided said two passwords correspond and cutting off a call incoming to the extension telephone until said power saving mode is changed into another mode; and sending back a signal for revoking said operation limit command to said extension telephone upon receipt of a signal asking for releasing the power saving mode from said extension telephone, and for re-setting a normal call service.

8. The power management method according to claim 7, further comprising the step of;

sending out into a calling party a message reporting that said extension telephone is in said power saving mode, if an incoming call is received to said extension telephone in which said power saving mode is set.

9. The power management method according to claim 7, further comprising the step of:

sending a message of confirmation once said two passwords do not correspond.

10. A simple electronic exchange system, comprising:

a plurality of extension telephones, each having units for inputting a key for setting or releasing a power saving mode of said system, a unit for transmitting a signal asking for setting or releasing the power saving mode of operation in response to the key input, and a display unit for displaying messages or states of said system; and a switching system operating from an auxiliary AC power when a main AC power is down, in response to a signal asking for setting said power saving mode from one of said extension telephones, sending back into said extension telephone a message of confirmation and a signal for stopping said display unit from operating, and cutting off a call incoming to said extension telephone until said power saving mode of operation is changed for another mode.

11. The simple electronic exchange system according to claim 10, further comprising:

a unit for sending out into a calling party a message reporting that said extension telephone is in said power saving mode, if an incoming call is received to said extension telephone in which said power saving mode is set.

* * * * *